UNITED STATES PATENT OFFICE.

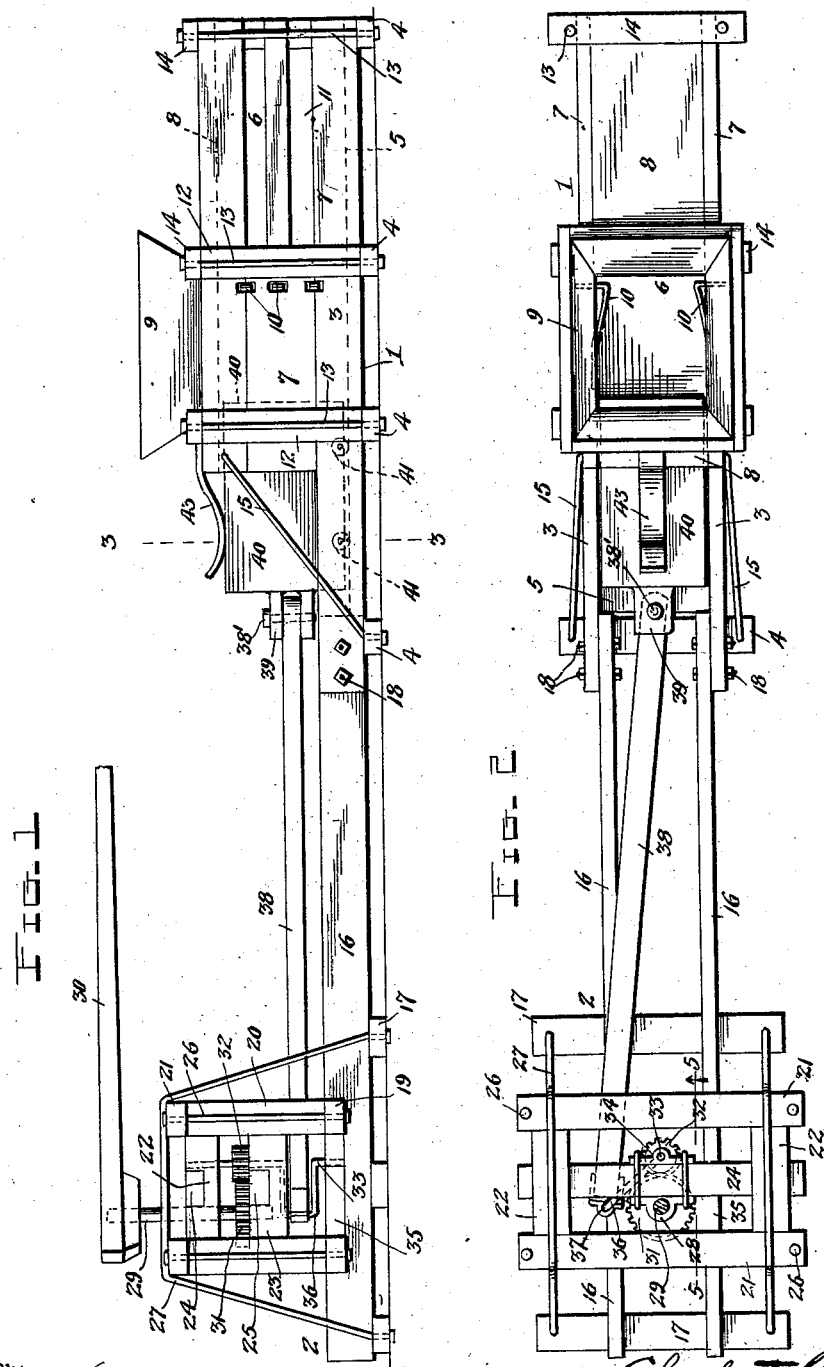

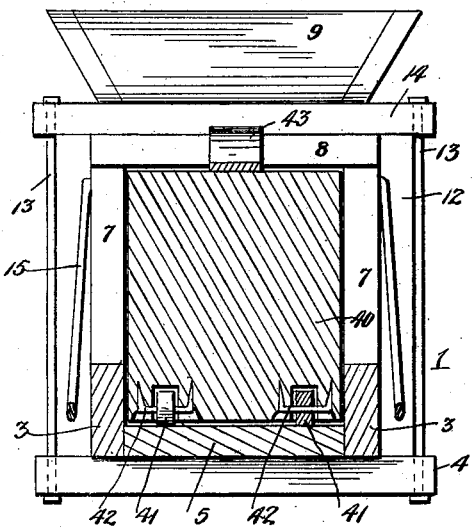
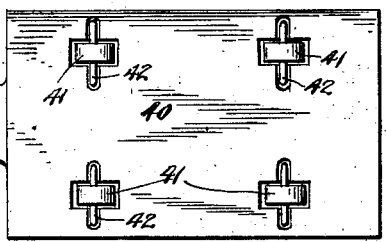
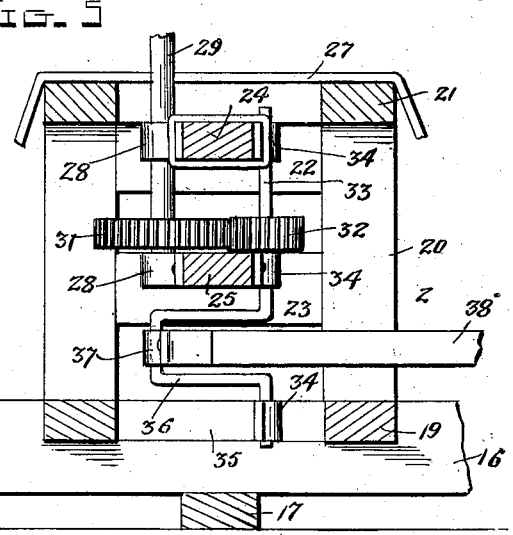

CHARLES T. MOORE, OF WHITEVILLE, TENNESSEE.

BALING-PRESS.

No. 860,146.  Specification of Letters Patent.  Patented July 16, 1907.

Application filed February 2, 1907. Serial No. 355,460.

*To all whom it may concern:*

Be it known that I, CHARLES T. MOORE, a citizen of the United States, residing at Whiteville, in the county of Hardeman and State of Tennessee, have invented certain new and useful Improvements in Baling-Presses, of which the following is a specification, reference being had therein to the accompanying drawing.

My invention relates to improvements in presses for baling hay and the like, and it consists of the novel construction, combination and arrangement of parts hereinafter described and claimed.

The object of the invention is to provide a simple, and practical machine of this character which will run smoothly and lightly without jerking the team of draft animals which operate it.

The above and other objects are accomplished by the improved construction illustrated in the accompanying drawings, in which Figure 1 is a side elevation of my improved hay press; Fig. 2 is a top plan view, the sweep being removed; Fig. 3 is a vertical transverse section, on an enlarged scale, taken on the plane indicated by the line 3—3 in Fig. 1; Fig. 4 is a bottom plan view of the plunger; and Fig. 5 is a detail vertical longitudinal section taken on the plane indicated by the line 5—5 in Fig. 2.

My improved bale or hay press comprises two detachably connected frame sections 1, 2, the former carrying the press and the latter the horse power for operating the press. The frame 1 consists of two longitudinal side beams 3 supported upon and united by a plurality of cross beams 4 and also by the bottom 5 of the bale chamber 6 of the press. This chamber 6 is formed by the bottom 5, two vertical sides 7 and a top 8, so that said chamber is of rectangular form. In the forward end of the top 8 is an inlet opening surrounded by a hopper 9 and arranged in the forward portions of the sides 7 are springs 10 which prevent the hay from being pulled back by the plunger as hereinafter explained. These springs 10 have their forward ends set in the inner faces of the side walls 7 and their right angularly bent rear ends projecting through and sliding in slots formed in the sides 7, as clearly shown in Figs. 1 and 2. The rear portions of the sides 7 are formed with longitudinal slots or openings 11 which permit of the wiring of the bale of hay. The frame of the press is materially strengthened by uprights 12 arranged upon its sides and by tie rods 13 which connect the lower cross beams 4 to upper cross beams 14 upon the top of the frame. An inclined tie rod 15 is also provided upon each side of the inner or front end of the press frame.

The horse power frame 2 comprises a pair of longitudinal side beams 16 having their outer ends supported upon and connected by cross beams 17 and their inner ends detachably connected to the inner ends of the beams 3. This detachable connection is preferably effected by inserting the inner ends of the beams 16 between the corresponding ends of the beams 3 and bolting them together, as shown at 18. It will be noted upon reference to Fig. 2 that the beams 16 rest upon the adjacent cross beam 4 and abut the inner end of the bottom 5 of the press which bottom projects beyond its sides 7 as shown. Set in the upper edges of the beams 16 are lower cross beams 19 which are connected by uprights 20 to upper cross beams 21. The latter are connected by short longitudinal beams 22, 23 which carry centrally disposed cross beams 24, 25. Vertical tie rods or bolts 26 connect the beams 19, 20 and tie rods 27 connect the upper cross beams 21 to the cross beams 17 so that the frame formed by the parts just described is securely fastened upon the longitudinal side beams 16. Journaled in bearings 28 upon the outer edges of the beams 24, 25 is a vertical drive shaft 29 carrying at its upper end a sweep 30 to which a team of draft animals may be attached. Fixed upon the lower portion of the shaft 29 is a gear 31 which meshes with a pinion 32 fixed upon the upper portion of a vertically disposed crank shaft 33 mounted in bearings 34 upon the inner edges of the cross beams 24, 25 and upon the cross beam 35. The crank 36 of the shaft 33 has connected to it a bearing 37 carried by one end of a pitman 38, the other end of which is detachably pivoted by a removable beam 38 between apertured ears 39 upon the plunger 40 of the press.

The plunger 40 is rectangular in form and of slightly less size in cross section than the baling chamber 6 in which it is adapted to reciprocate. To lessen the friction and to render the plunger light and easy in operation I provide in its bottom supporting rollers 41. These rollers of which there are preferably, but not necessarily, two pairs, are journaled upon substantially U-shaped bars 42 which resemble staples and which are driven into recesses formed in the bottom of the plunger as clearly shown in Figs. 3 and 4. In order to prevent the top of the plunger from contacting the top 8 of the press frame I provide upon the latter at its front or inner end a leaf spring 43 which has its rearwardly projecting free end curved and bearing upon the top of the plunger as will be readily seen upon reference to Fig. 1.

The construction, operation and advantages of the press will be readily understood upon reference to the drawings. When the two frames 1, 2 are set up for use and connected together by the bolts 18 the hay or other material to be baled is deposited in the hopper 9 and as the team of draft animals hitched to the sweep 30 rotate the shaft 29 its gear 31 will drive the pinion 32 and hence rotate the crank shaft 33 the motion of which latter will be imparted to the plunger by means of the pitman 38. As the plunger is thus reciprocated it will force the hay in front of it rearwardly into the chamber of the press and against the usual stationary head. The spring stops 10 are forced outwardly by the plunger as it passes them but spring inwardly as it releases them and stop the hay from being pulled back by the plunger. The provision of the supporting rollers 41 and the spring 43 holds the plunger centrally in the press and greatly reduces friction so that the press is light and easy in operation.

Having thus described my invention what I claim and desire to secure by Letters Patent is:

1. In a baling press, a frame or casing, a plunger mounted for reciprocation therein and formed in its bottom with recesses, rollers arranged in said recesses and having central apertures and journals for said rollers of substantially U-shape, said journals having their cross portions projecting through the apertures in the rollers and their tapered ends driven into the plunger on opposite sides of the recesses in its bottom, substantially as described.

2. In a baling press, the two detachably connected frame sections 1, 2, the former having the cross beams 4 connecting the parallel longitudinal beams 3, and the latter having the cross beams 17 connecting the parallel longitudinal beams 16, said beams 16 being inserted between the beams 3 and engaged with one of the cross beams 4, the bolts 18 uniting the beams 16 and 3, a baling chamber upon the section 1, a plunger mounted for reciprocation in said chamber and having at its outer end spaced ears formed with vertically alining apertures, an upright frame arranged upon the outer ends of the beams 16, cross beams arranged in said upright frame, vertically alining bearings upon the opposite sides of the last mentioned cross beams, parallel vertical shafts in said bearings, a sweep upon the upper end of one of said shafts, a gear upon the lower end of the last mentioned shaft, a pinion upon the other shaft in mesh with said gear, a crank upon the lower portion of the shaft carrying said pinion, a pitman connected to said crank and having its other end arranged between the ears on a plunger, and a removable pivot pin passed vertically through the alining apertures in said pitman and said ears, substantially as described.

In testimony whereof I hereunto affix my signature in presence of two witnesses.

CHARLES T. MOORE.

Witnesses:
   W. T. MOORE,
   FRANK MOORE.